United States Patent [19]

Krall

[11] Patent Number: 5,655,684
[45] Date of Patent: Aug. 12, 1997

[54] PLASTIC SQUEEZE TUBE AND DISPENSING SYSTEM

[75] Inventor: Thomas J. Krall, Toledo, Ohio

[73] Assignee: Owens-Brockway Plastic Products Inc., Toledo, Ohio

[21] Appl. No.: 473,482

[22] Filed: Jun. 7, 1995

[51] Int. Cl.⁶ ............................................. B67D 5/00
[52] U.S. Cl. ........................ 222/91; 222/105; 222/556
[58] Field of Search ........................ 222/91, 556, 105, 222/107, 153.01, 153.05, 153.06, 153.07, 541.1, 541.6, 541.9

[56] References Cited

U.S. PATENT DOCUMENTS

| | | | |
|---|---|---|---|
| 2,873,886 | 2/1959 | Miskel et al. | 222/91 |
| 3,078,017 | 2/1963 | Waskonig et al. | 222/105 X |
| 4,234,103 | 11/1980 | Strobl, Jr. et al. | 222/91 X |
| 5,236,108 | 8/1993 | House | 222/541.9 |

FOREIGN PATENT DOCUMENTS 941039  11/1963  United Kingdom ............... 222/105

*Primary Examiner*—Kevin P. Shaver

[57] ABSTRACT

A plastic squeeze tube and dispensing system wherein the plastic tube includes a first end that is closed and has an opening therethrough for hanging the tube from a display rack with graphics on the tube being readily visible. The plastic squeeze tube further includes a second end that is normally closed. Interengaging threads are provided on the second end for engagement with a reusable dispenser. In one form, the second end of the squeeze tube is closed by an integral portion of the tube and the dispenser includes threads for engaging the second end and a member for piercing the integral end. In another form, the second end of the plastic tube is closed by a removable seal and the dispenser includes threads for engaging the threads on the plastic tube and has a dispensing opening. In a further form the threads on the tube are formed by a split tube holder that is mounted on the second end of the tube and has threads thereon for engagement with threads of a dispenser. In another form, the plastic squeeze tube comprises a plastic pouch and the threads are formed on a pouch holder that engages the second end of the squeeze tube and has threads thereon for engagement with threads of a dispenser that includes a portion for piercing the pouch to dispense the contents. In each of the forms a hinged closure is provided for the dispenser.

12 Claims, 4 Drawing Sheets

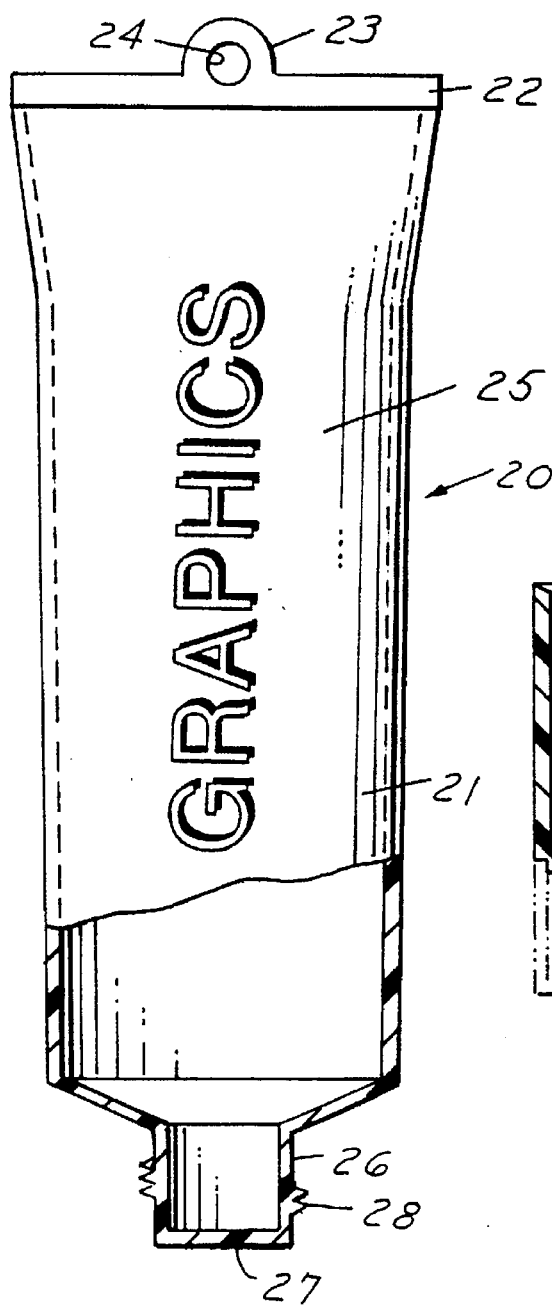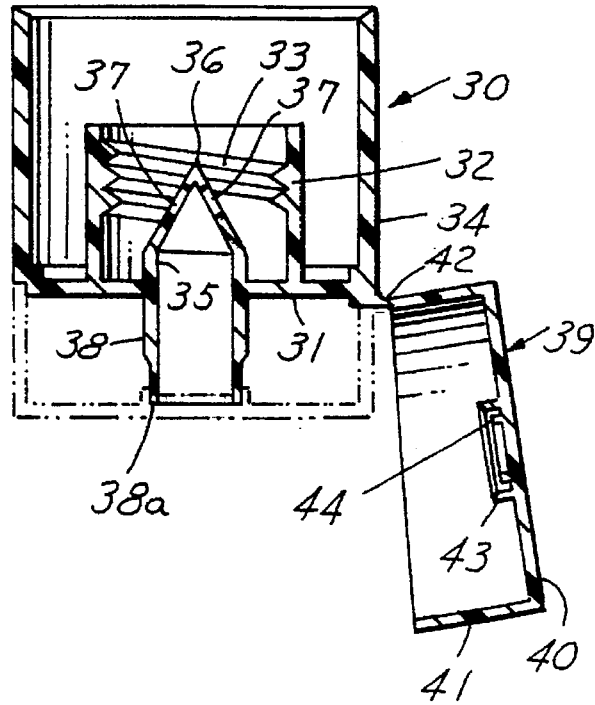

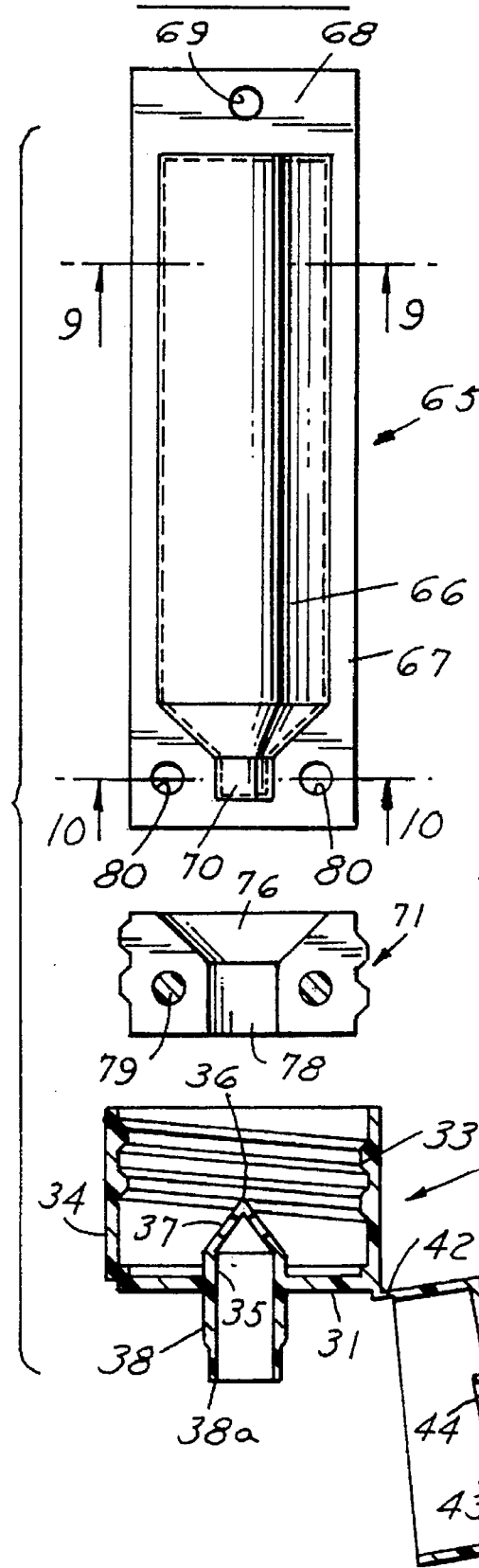
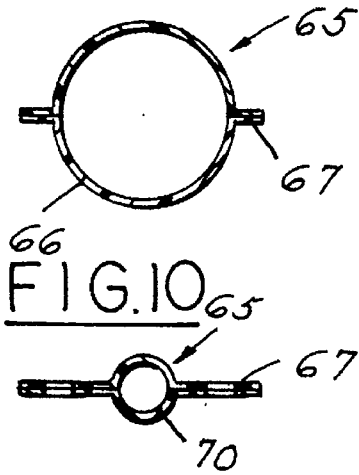
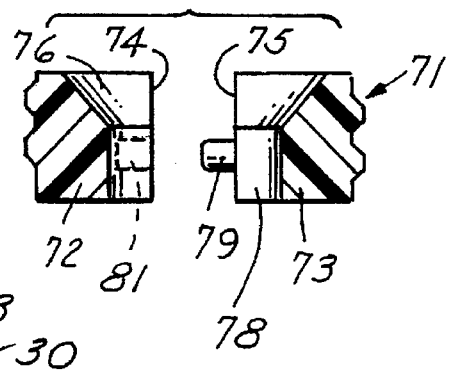

PLASTIC SQUEEZE TUBE AND DISPENSING SYSTEM

This invention relates to plastic squeeze tubes.

BACKGROUND AND SUMMARY OF THE INVENTION

In the use of plastic squeeze tubes it is common to provide a squeeze tube with a closed end and an open end and with a closure that is threaded on the open end of the squeeze tube. Such squeeze tubes are sometimes displayed in boxes to facilitate shelf display and present brand identification. Other squeeze tubes are sold without a display box but require special display racks. When tamper evidence is required, a shrink wrap is often used.

Among the objectives of the present invention are to provide a plastic squeeze tube and dispensing system that does not require a closure; which does not require a tamper evident shrink wrap; and which therefore is less costly; which eliminates the conventional closure and thereby extends the shelf life of the squeeze tube; which involves less solid waste as might be produced by a display box, a closure and a shrink wrap; which can be readily displayed on a retail display rack by hanging; and wherein when displayed the brand graphics are properly oriented for view by the customer.

In accordance with the invention, a plastic squeeze tube and dispensing system includes the plastic tube having a first end that is closed which has an opening therethrough for hanging the tube from a display rack with graphics on the tube being readily visible. The plastic squeeze tube further includes a second end that is normally closed by an integral wall. Interengaging threads are provided on the second end for engagement with threads on a reusable dispenser. In one form, the second end of the squeeze tube is closed by an integral portion of the tube and the dispenser includes threads for engaging the second end and a member piercing the integral end. In another form, the second end of the plastic tube is closed by a removable seal. In a further form the threads on the tube are formed by a split tube holder that is mounted on the second end of the tube and has threads thereon for engagement with threads of a dispenser. In another form, the plastic squeeze tube comprises a plastic pouch formed by two complementary halves bonded to one another. In use, a split fitment is clamped on the second end of the squeeze tube and has threads thereon for engagement with threads of the reusable dispenser. In each of the forms a hinged closure is provided for the reusable dispenser.

DESCRIPTION OF THE DRAWINGS

FIG. 1 is a part sectional view of a plastic squeeze tube embodying the invention.

FIG. 2 is a sectional view of a reusable dispenser for the tube shown in FIG. 1.

FIG. 7 is an exploded view of a further modified form of plastic tube package.

FIG. 8 is an exploded view of a portion of the plastic squeeze tube shown in FIG. 7.

FIG. 9 is an exploded view of a split fitment used in the package shown in FIG. 7.

FIG. 10 is a sectional view taken along the lines 10—10 in FIG. 7.

DESCRIPTION

Figure 3:
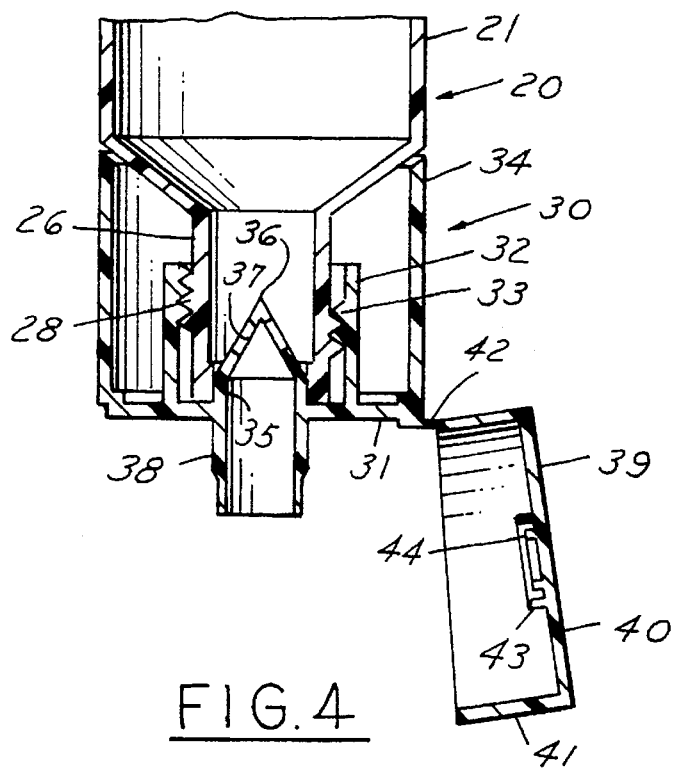
FIG. 3 is a fragmentary sectional view showing the dispenser in position on the tube.

Referring to FIGS. 1–3, the plastic squeeze tube 20 embodying the invention comprises a plastic body 21 that is made of single or multilayer flexible plastic and has a closed end 22 defined by a seal and an integral tab 23 having an opening 24 by which it may be suspended on an ordinary display rack. Body 21 includes graphics 25 that are readily visible when the tube 20 is displayed. The tube 20 includes a second end formed with a finish 26 having an integral closed wall or end 27 and integral external threads 28.

The plastic tube 20 is adapted to be used with a reusable dispenser 30 (FIG. 2) that includes a base wall 31, an inner cylindrical skirt 32 having integral internal threads 33 for engagement with the external threads 28 on tube 20. The dispenser 30 further includes an outer cylindrical skirt 34 having a diameter substantially that of the lower end of the body 21.

The dispenser 30 also includes an integral hollow conical portion 35 that extends axially inwardly from the base wall 31 into skirt 32. The conical portion 25 has a point 36 for piercing the wall 27 of the tube 20. The conical portion 35 further includes openings 37 through which the contents will pass through an integral outlet 38 upon squeezing of the tube body 21.

The dispenser 30 includes an integral closure 39 that has a base wall 40 and a peripheral skirt 41 and is connected to the outer skirt 34 by an integral hinge 42 so that it can be closed about an integral dispensing outlet opening 38 that extends axially outwardly from the opposite side of base wall 31 and is axially aligned with conical portion 35. The closure 39 includes spaced annular seals 43, 44 defining a space for receiving the free end 38a of outlet 38 and for sealing against opposite sides of the dispensing opening 38.

Figure 4:
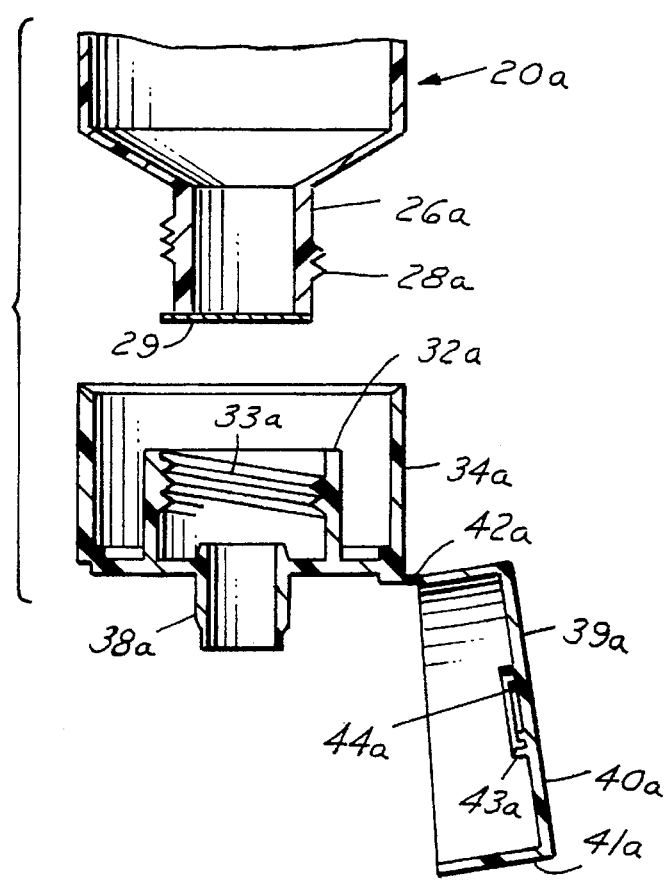
FIG. 4 is an exploded fragmentary sectional view of a modified form of plastic tube and dispenser.

In the form shown in FIG. 4, the tube 20a has the finish 26a closed by a removable seal 29. In this form, the dispenser 30a is provided without the inwardly extending conical portion 35 of the previous form of the invention. The user removes the seal and applies the dispenser 30a permitting the contents to be dispensed.

Figure 5:
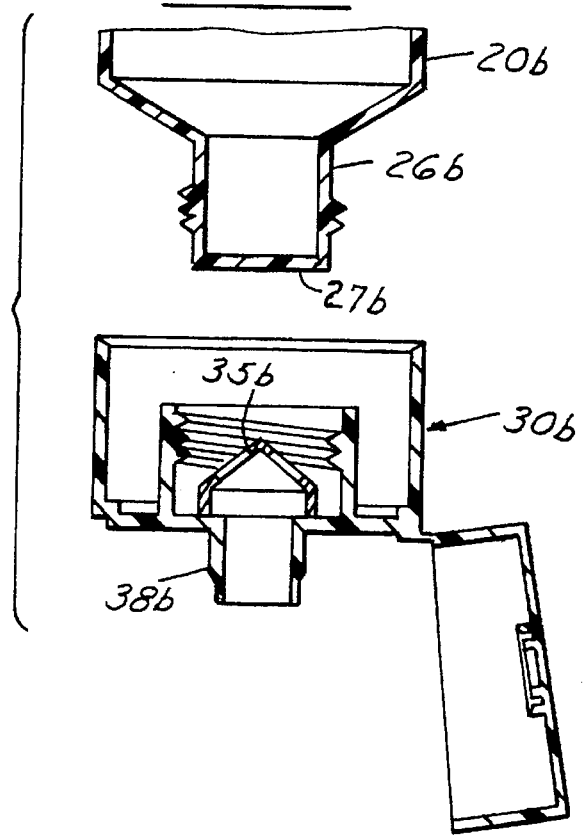
FIG. 5 is a fragmentary exploded sectional view of a further modified form of plastic tube and dispenser.

In the form shown in FIG. 5, the plastic tube 20b has a second end 26b of greater diameter than that shown in FIG. 1. The dispenser 30b has a separate frustoconical portion 35b formed by a separate piece and bonded thereto by sonic welding, spin welding or other methods well known in the art. Otherwise the dispenser 30b is substantially identical to that shown in FIG. 2.

Figure 6:
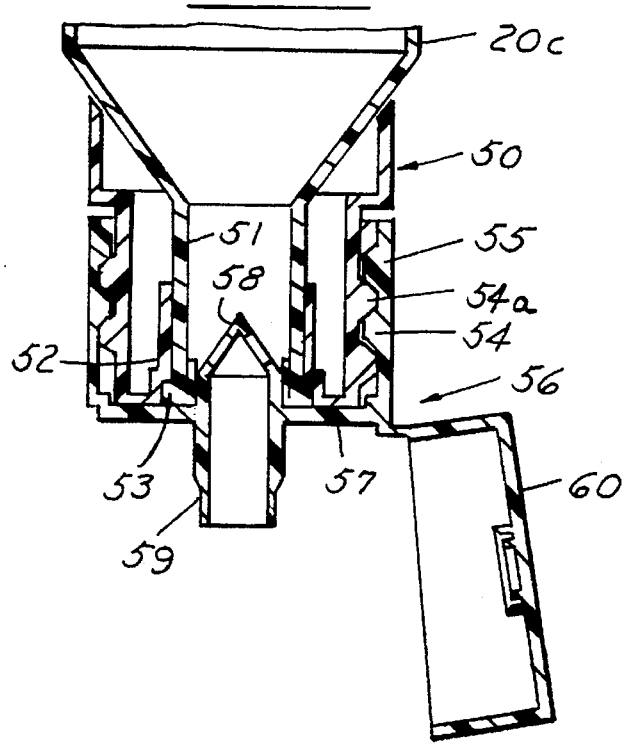
FIG. 6 is a fragmentary sectional view of another modified form of tube and disclosure.

In the form shown in FIG. 6, tube 20c is not provided with integral threads but the threads are formed by a split tube holder 50 that consists of two halves that are brought together about the second end 51 and define an annular shoulder 52 engaging an annular bead 53 on the second end of the tube 20c. The holder 50 includes external threads 54a that are adapted to engage threads 54 on a cylindrical wall 55 of a reusable dispenser 56 that includes an integral wall 57, a conical portion 58 and a dispensing portion 59. The dispenser 56 includes an integral closure 60 as in the previous forms of the invention.

In the form shown in FIGS. 7–10, the plastic tube 65 is made by bringing two complementary preformed plastic parts together and bonding them about the flat complementary peripheral portions 67 to form a plastic tube 65. The complementary parts have a configuration to define a first end 68 having a hanging opening 69 and a second end 70 with a closed end. A reusable fitment 71 made of two complementary portions 72, 73 that come together along planar surfaces 74, 75 to define a frustoconical opening 76 and an axial opening 78 when the portions 72, 73. When the user wishes to dispense the contents of the tube 65, the two halves of fitment 71 are clamped about the second end of tube 65 with integral dowels 79 in portion 73 passing through openings 80 in the lower end of the tube 65 into openings 81 in portion 72. The portions 72, 73 have external threads such that when a dispenser 30; such as shown in FIG. 2 is threaded on fitment 71, the package functions in the same manner as described with respect to FIGS. 1–3 to pierce the closed end of the tube 65 when the dispenser is threaded onto the tube 71.

The plastic tube 20, 20a, 20c, 65 may be made of ethylene plastic and is preferably made of polyethylene plastic. The reusable dispenser 30, 30a, 30b and 56 may be made of polyolefin plastic and preferably made of polypropylene plastic. The holder 50 may be made of polyolefin plastic and is preferably made of polypropylene plastic. The fitment 71 may be made of polyolefin plastic and is preferably made of polypropylene plastic.

It can thus be seen that there has been provided a plastic tube package and dispensing system tube and dispensing system includes the plastic tube having a first end that is closed which has an opening therethrough for hanging the tube from a display rack with graphics on the tube being readily visible. The plastic squeeze tube further includes a second end that is normally closed by an integral wall. Interengaging threads are provided on the second end for engagement with threads on a reusable dispenser. In one form, the second end of the squeeze tube is closed by an integral portion of the tube and the dispenser includes threads for engaging the second end and a member piercing the integral end. In another form, the second end of the plastic tube is closed by a removable seal. In a further form the threads on the tube are formed by a split tube holder that is mounted on the second end of the tube and has threads thereon for engagement with threads of a dispenser. In another form, the plastic squeeze tube comprises a plastic pouch formed by two complementary halves bonded to one another. In use, a split fitment is clamped in the second end of the squeeze tube and has threads thereon for engagement with threads of the reusable dispenser. In each of the forms a hinged closure is provided for the reusable dispenser.

What is claimed is:

1. A plastic squeeze tube and a reusable dispenser system comprising
   a plastic tube including a first end that is closed and has an opening therethrough for hanging the tube from a display rack with graphics on the tube being readily visible,
   said squeeze tube including a second end that is normally closed, and
   said reusable dispenser having threads thereon comprising a split tube holder mounted on the second end of the tube and having threads thereon engaging said dispenser.

2. The plastic squeeze tube and reusable dispenser set forth in claim 1 wherein said reusable dispenser comprises a base wall, an inner cylindrical skirt having integral internal threads and an outer cylindrical skirt having a diameter substantially that of the second end of said tube,
   said second end of said tube being closed by an integral portion,
   said reusable dispenser including an integral hollow portion extending axially from the base wall toward the closed end of said tube and having a conical portion defining a point for piercing said integral wall of said tube upon threading said dispenser on said tube,
   said reusable dispenser including a dispensing outlet extending from said base wall through which the contents may pass.

3. The plastic squeeze tube and reusable dispenser set forth in claim 2 including an integral closure hinged to said outer skirt including a base wall and a peripheral skirt, said peripheral skirt having a diameter substantially that of said outer skirt.

4. The plastic squeeze tube and reusable dispenser set forth in claim 3 wherein said closure includes spaced annular seals for sealing against opposite sides of said dispensing outlet.

5. A plastic squeeze tube and a reusable dispenser system comprising
   a plastic tube including a first end that is closed and has an opening therethrough for hanging the tube from a display rack with graphics on the tube being readily visible,
   said plastic squeeze tube comprising a pouch formed by complementary preformed plastic portions bonded about the periphery of said portions to form said pouch,
   said squeeze tube including a second end that is normally closed,
   a split tube fitment engaging said second end and gripping said plastic portions,
   said fitment defining external threads,
   a reusable dispenser having threads thereon engaging said threads on said fitment,
   said reusable dispenser having means thereon such that the closed end of said spout is pierced when the reusable dispenser is threaded on said fitment.

6. A plastic squeeze tube and a reusable dispenser comprising
   a plastic tube including a first end that is closed and has an opening therethrough for hanging the tube from a display rack with graphics on the tube being readily visible,
   said squeeze tube including a second end that is normally closed, and
   a reusable dispenser,
   said reusable dispenser comprising a base wall, an inner cylindrical skirt having integral internal threads and an outer cylindrical skirt having a diameter substantially that of the lower end of said tube,
   said second end of said tube being closed by an integral portion,
   said lower end of said tube having external threads complementary to the threads on said inner cylindrical skirt of said reusable dispenser,
   said reusable dispenser including an integral hollow portion extending axially from the base wall toward the closed end of said tube and having a conical portion defining a point for piercing said integral wall of said tube upon threading said dispenser on said tube,
   said reusable dispenser including a dispensing outlet extending from said base wall through which the contents may pass.

7. The plastic squeeze tube and reusable dispenser set forth in claim 6 including an integral closure hinged to said outer skirt of said reusable dispenser including a base wall and a peripheral skirt, said peripheral skirt having a diameter substantially that of said outer skirt of the dispenser.

8. The plastic squeeze tube and reusable dispenser set forth in claim 7 wherein said closure includes spaced annular seals for sealing against opposite sides of said dispensing outlet.

9. A plastic squeeze tube and a reusable dispenser comprising a plastic tube including a first end that is closed and has an opening therethrough for hanging the tube from a display rack with graphics on the tube being readily visible, said squeeze tube including a second end that is normally closed, and a reusable dispenser, a split tube holder including an annular shoulder, said second end of said tube having an annular bead engaged by said annular shoulder, said shoulder including external threads, said reusable dispenser having internal threads engaging said external threads, said reusable dispenser having means thereon for piercing said second end of said tube when the dispenser is threaded on said holder.

10. The plastic squeeze tube and reusable dispenser set forth in claim 9 wherein said reusable dispenser comprises a base wall, an inner cylindrical skirt having integral internal threads and an outer cylindrical skirt, said second end of said tube being closed by an integral portion, said reusable dispenser including an integral hollow portion extending axially from the base wall toward the closed end of said tube and having a conical portion defining a point for piercing said integral wall of said tube upon threading said dispenser on said tube, said reusable dispenser including a dispensing outlet extending from said base wall through which the contents may pass.

11. The plastic squeeze tube and reusable dispenser set forth in claim 10 including an integral closure hinged to said outer skirt including a base wall and a peripheral skirt, said peripheral skirt having a diameter substantially that of said outer skirt.

12. The plastic squeeze tube and reusable dispenser set forth in claim 11 wherein said closure includes spaced annular seals for sealing against opposite sides of said dispensing outlet.

* * * * *